No. 649,105. Patented May 8, 1900.
O. P. LOOMIS.
APPARATUS FOR ELECTRIC LIGHTING, &c.
(Application filed Feb. 15, 1899.)
(No Model.) 2 Sheets—Sheet 1.
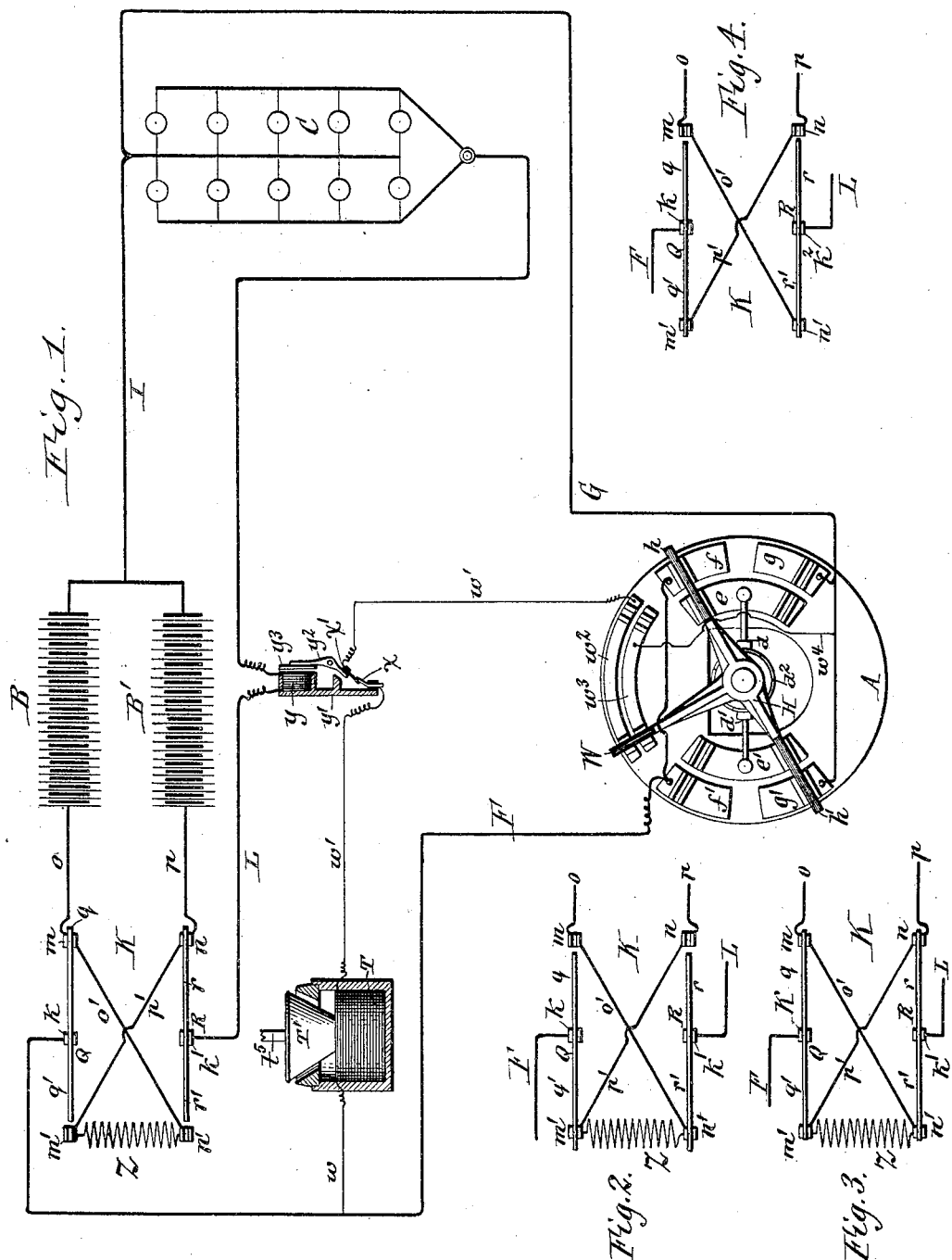
Witnesses:
Chas. F. Burkhart.
Henry L. Deck.
Osborn P. Loomis Inventor.
By Wilhelm Bonner
Attorneys.

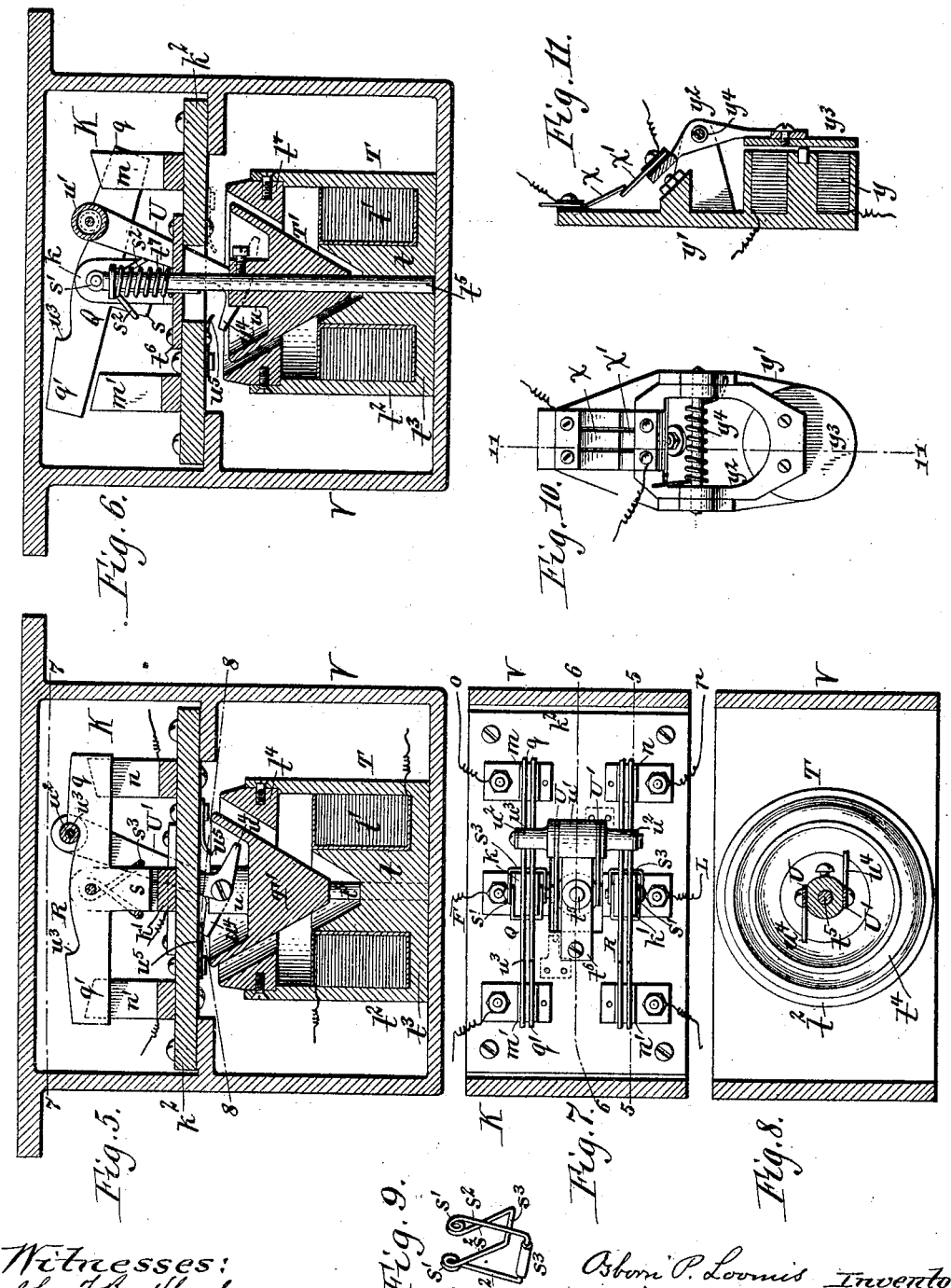

UNITED STATES PATENT OFFICE.

OSBORN P. LOOMIS, OF DEPEW, NEW YORK, ASSIGNOR TO CHARLES M. GOULD, OF BUFFALO, NEW YORK.

APPARATUS FOR ELECTRIC LIGHTING, &c.

SPECIFICATION forming part of Letters Patent No. 649,105, dated May 8, 1900.

Application filed February 15, 1899. Serial No. 705,578. (No model.)

*To all whom it may concern:*

Be it known that I, OSBORN P. LOOMIS, a citizen of the United States, residing at Depew, in the county of Erie and State of New York, have invented new and useful Improvements in Apparatus for Electric Lighting, &c., of which the following is a specification.

This invention relates to an electric lighting or heating apparatus which embodies a dynamo or generator and two storage batteries and in which the dynamo is driven intermittently and in some cases rotated in either direction—as, for instance, when the apparatus is used on a railroad-car and the dynamo is driven from one of the car-axles. In apparatus of this kind the batteries have been connected with the charging and service circuits by an automatic switch of such construction that one of the batteries was connected with the charging-circuit and the other with the service-circuit and that the connection was alternated upon the stopping or starting of the dynamo or the interruption of the current in the charging-circuit.

The main object of the present invention is to organize the apparatus in such manner that in addition to the alternating of the battery connections the batteries are coupled in parallel with the charging-circuit when the service-circuit is broken or with the service-circuit when the charging-circuit is broken, so that in the case of a lighting apparatus both batteries are connected in parallel with the lights and feed the same simultaneously when the generator is cut out or idle and both batteries are connected in parallel with the charging-circuit and are simultaneously charged when the lights are cut out.

In the accompanying drawings, consisting of two sheets, Figure 1 is a diagram illustrating my improved electric-lighting system, showing the circuits when the battery-switch is in one of its extreme positions. Fig. 2 is a fragmentary diagram showing the battery-switch in the other extreme position and the adjacent parts of the circuits. Fig. 3 is a similar diagram showing the battery-switch in a balanced position. Fig. 4 is a similar diagram showing the resistance between the generator and the lamps omitted. Fig. 5 is a vertical longitudinal section of the battery-switch in line 5 5, Fig. 7, showing the switch-levers in a central or balanced position. Fig. 6 is a similar section taken in line 6 6, Fig. 7, and showing the switch-levers turned fully in one direction, so that their arms on one side of the pivots engage with the opposing contacts, while their arms on the opposite side of the pivots are disengaged from the opposing contacts. Figs. 7 and 8 are horizontal sections in lines 7 7 and 8 8, Fig. 5, respectively. Fig. 9 is a perspective view of the righting-springs of one of the battery-switch levers. Fig. 10 is a front elevation of the electromagnetic switch whereby the battery-switch magnet is cut out when the lamps are cut out. Fig. 11 is a vertical section of the same in line 11 11, Fig. 10.

Like letters of reference refer to like parts in the several figures.

A represents the insulating-switchboard of the dynamo or electric generator, B B' the two storage batteries, and C the electric lamps or other translating devices in which the current is utilized. When this system is used for lighting railway-cars, the armature of the dynamo is driven from one of the axles of the car and its brushes $d\ d'$ engage with the commutator $d^2$ of the armature, so as to permit of turning the latter in either direction and operating the dynamo when running the car forward or backward. In order to permit of reversing the movement of the armature without changing the direction or polarity of the current, an automatic pole-reversing device of any suitable construction is employed. The reversing device indicated in the drawings is substantially the same as that which is shown and described in Letters Patent No. 602,182, dated April 12, 1898, and No. 617,121, dated January 3, 1899, both granted to Preston and Gill. This reversing device, briefly stated, is constructed as follows: $e\ e'$ represent two contact-plates arranged on opposite sides of the armature and connected, respectively, with the brushes $d\ d'$. $f\ f'$ are two contact-plates which are arranged adjacent to the brush contact-plates $e\ e'$, respectively, and which are both connected to the wire F, which is one of the main conductors of the dynamo. $g\ g'$ represent two contact-plates, which are also arranged adjacent to the brush contact-plates $e\ e'$, respectively, and which are both connected to the other main conducting-wire G of the dynamo. H represents the contact-lever supported on the shaft of the armature and provided with two blades $h\ h'$. When the armature is turning in one direction, the contact-lever makes contact by its blades $h\ h'$, respectively, with the contact-plates $e\ f$ and $e'\ g'$, as shown in Fig. 1. When the contact-lever is reversed, it makes contact, respectively, with the contact-plates $e\ g$ and $e'\ f'$. For a full description of this reversing device reference is made to the above-mentioned Letters Patent.

One side of the lamps is connected with the dynamo by the main wire G and with the like terminals of both storage batteries by a wire I. The opposite like poles of the batteries are connected to a battery-switch K, whereby both batteries may be connected in parallel with the lamps or with the dynamo or whereby one of the batteries may be connected directly with the dynamo for receiving a charge therefrom, while the other battery is connected indirectly with the dynamo and directly with the lamps for regulating the pressure upon the latter. This switch is constructed as follows: $k\ k'$ represent two posts which are arranged side by side on an insulator-base $k^2$. The post $k$ is connected with the dynamo by the main wire F, and the other post $k'$ is connected with the lamps by a wire L. $m\ m'$ are two contacts arranged on the base $k^2$ in line with and on opposite sides of the post $k$, and $n\ n'$ are two similar contacts arranged in line with and on opposite sides of the other post $k'$. The adjacent terminal of the storage battery B is connected by a wire $o$ with the contact $m$ and by a diagonal wire $o'$ with the contact $n'$. The adjacent terminal of the other storage battery B' is connected by a wire $p$ with the contact $n$ and by a diagonal wire $p'$ with the contact $m'$. The contact $n'$, therefore, forms the extreme terminal of the battery B and the contact $m$ is located in the conductor connecting the battery with this extreme terminal, while the contact $m'$ forms the extreme terminal of the battery B' and the contact $n$ is located in the conductor connecting this battery with this extreme terminal.

Q and R represent a pair of parallel switch-levers which are arranged side by side in a substantially-horizontal position and each of which is pivoted at its middle, one to the post $k$ and the other to the post $k'$. These levers are adapted to connect and disconnect said posts and the contacts on opposite sides thereof. Upon tilting the switch-levers into the position shown in Figs. 1 and 6 the arm $q$ of the switch-lever Q is engaged with the contact $m$, while the other arm $q'$ is disengaged from the contact $m'$, and the arm $r$ of the switch-lever R is engaged with the contact $n$, while its other arm $r'$ is disengaged from the contact $n'$, thereby placing the storage battery B in direct circuit with the dynamo and the other storage battery B' in direct circuit with the lamps. Upon tilting the switch-levers Q R fully in the opposite direction, as shown in Fig. 2, the arm $q'$ of the switch-lever Q is engaged with the contact $m'$ and its other arm $q$ is disengaged from the contact $m$ and the other arm $r'$ of the switch-lever R is engaged with the contact $n'$ and its other arm $r$ is disengaged from the contact $n$, thereby reversing the relation of the batteries to the lamps and dynamo and connecting the battery B' directly with the dynamo and the battery B directly with the lamps. When the switch-levers Q R are horizontal or in a balanced central position, as shown in Figs. 3, 5, and 7, the arms $q\ q'$ of the switch-lever Q engage simultaneously with the contacts $m$ and $m'$ and the arms $r\ r'$ of the switch-lever R engage simultaneously with the contacts $n\ n'$, thereby placing both storage batteries in parallel and in direct connection with the lamps or the dynamo. When the switch-levers are in this balanced position and the batteries are connected in parallel, both batteries are charged at the same time by the dynamo if the lamps are cut out or both batteries feed the lamps at the same time if the dynamo is stopped or cut out.

Each of the switch-levers Q R is provided centrally with a depending righting-arm $s$ and when free is yieldingly held in a horizontal balanced position by a balancing-spring S. The latter consists of two coils $s'\ s'$, surrounding the pivot of the switch-lever on opposite sides of its post, diverging arms $s^2$ extending downwardly from the ends of each coil and cross-bars $s^3$ connecting the arms of both coils on the same side of the post, as shown in Fig. 9. The cross-bars bear against both sides of the post and the righting-arm when the switch-lever is balanced or horizontal, as shown in Fig. 5, and tend to return the lever to this position.

Upon depressing the switch-arm on one side of the post the cross-bar connecting the spring-arms on the same side of the post is pressed against the post, while the spring-arms and cross-bar on the other side of the post are deflected by the righting-arm, as represented in Fig. 6. When the switch-lever is free, the deflected arms of the spring turn the lever and its righting-arm back until both cross-bars of the spring bear against opposite sides of the post, in which position of the spring the switch-lever is horizontal. Each of the switch-levers and its righting-arm are preferably made out of two or more plates, which are arranged side by side, with a space between them, and the posts are made comb-shaped to receive the lever and its righting-arm between the members of the post, as shown in Figs. 5, 6, and 7.

T T' represent an electromagnet and its armature, whereby the switch-levers are tilted and which are preferably of the solenoid type. The magnet consists of a core $t$, having a conical concave upper or front end, a coil $t'$, surrounding the core, a casing or shell $t^2$, surrounding the coil, a head $t^3$, connecting the rear or lower ends of the core and shell, and a ring $t^4$, arranged on the upper end of the shell and having a conical concave inner side which is in line with the conical upper face of the core. The conical faces of the core and the ring form together the pole of the magnet. The armature is provided on its lower side with a conical convex face which fits into the conical pole of the magnet. This construction of the magnet and armature increases the area of the opposing faces on the magnet and armature, and therefore increases the power of the magnet. The armature is guided in its movement toward and from the magnet by an axial guide-rod $t^5$, Fig. 6, to which it is secured and which slides with its lower end in an opening in the core of the magnet and with its upper portion in a plate $t^6$, secured to the insulating-base $k^2$. The armature is yieldingly held in its retracted or elevated position by a spring $t^7$, surrounding the guide-rod and bearing with its ends against the top of the plate $t^6$ and a shoulder on the upper end of the guide-rod.

U U' represent two links, whereby the armature is connected with the switch-levers, and the latter are tilted by the forward or downward movement of the armature. These links are arranged on opposite sides of the guide-rod $t^5$ and plate $t^6$ and move in an opening in the insulating-base $k^2$, Fig. 7. The links are pivoted at their lower ends to opposite sides of a hub $u$ on the upper side of the armature and their upper ends are connected by an insulated cross-bar $u'$. The links are arranged between the switch-levers Q R and are provided at their upper ends with laterally-projecting studs $u^2$, of insulating material, which bear against the upper sides of the switch-levers, respectively. The upper side of each switch-lever is preferably curved convexly along its central portion and provided at the ends of this curved portion on opposite sides of the pivot with shoulders or stops $u^3$. Each of the links is provided adjacent to its pivot at its lower end with a laterally-projecting trip or shifting arm $u^4$, the trip-arms of both links projecting in opposite directions, as shown in Figs. 5 and 8. These trip-arms engage alternately with yielding stops or springs $u^5$ during the last portion of the upward movement of the armature, and thereby turn the links alternately from one side to the other of the pivot of the switch-levers. These yielding stops are secured to the under side of the insulating-base $k^2$, and the latter and the magnet are mounted in a supporting-frame V, which is secured to the car-body or other support. During the downward movement of the armature the studs $u^2$ at the upper ends of the links bear against the shoulders $u^3$ of the switch-levers on one side of the pivots thereof and pull the respective arms downwardly, as shown in Fig. 6. During the subsequent upward movement of the armature and the links the righting-springs S return the switch-levers into a horizontal position, and during the last portion of this movement the trip-arm on the side opposite to that toward which the links incline strikes against its spring-stop $u^5$, thereby turning the links so that the upper ends thereof move from the shoulders on one side of the switch-levers to the shoulders on the opposite side thereof. During the next downward movement of the armature the switch-levers are tilted by the links in the opposite direction, and when the armature rises the links are shifted back to the position shown in Figs. 5 and 6 by the uppermost trip-arm $u^4$ striking the respective spring-stop $u^5$. By this means the switch-levers are alternately tilted in opposite directions by the successive reciprocations of the armature.

The coil of the switch-magnet is connected at one end by a wire $w$, Fig. 1, with the main wire F of the dynamo and at its opposite end by a wire $w'$ with a contact $w^2$. The latter, together with a contact-plate $w^3$, forms a pair, which is arranged on the dynamo-board A adjacent to the reversing contact-lever H. The contact-plate $w^3$ is connected by a wire $w^4$ with the main dynamo-wire G.

W is a contact-blade arranged on an arm of the contact-lever H and adapted to cross the contact-plates $w^2$ $w^3$ in either extreme position of the lever. When the contact-lever H makes contact with either of its sets of contacts, and thereby closes the circuit through the main wires F and G, the blade W makes contact with its contacts $w^2$ $w^3$, and so closes the circuit through the branch wires $w$ $w'$ and the magnet-coil T in the same. When the contact-lever H moves away from its contacts by the movement of this lever away from the switchboard A of the dynamo, the blade W moves away from its contacts $w^2$ $w^3$, and so breaks the circuit through the branch wires $w$ $w'$. This prevents the storage batteries from maintaining a current through the branch circuit when the circuit through the main wires F G is broken. The battery-switch is wound to a high resistance, so as to avoid short-circuiting the dynamo.

$x$ $x'$ represent the two contacts of a switch which is arranged in the branch circuit in which the battery-switch magnet is arranged. This branch switch is opened or closed by an electromagnet $y$, which is included in the wire L of the lamp-circuit. The contact $x$ is secured to the frame $y'$, which supports the branch-switch magnet $y$. The contact $x'$ is arranged on one arm of a lever $y^2$, which is pivoted on said frame and which carries the armature $y^3$ of the branch-switch magnet on its other arm. When the lamps are in use, the current traverses the branch-switch magnet $y$, whereby the armature of the latter is attracted and the switch-contacts $x$ $x'$ are engaged, thereby closing the branch circuit through the battery-switch magnet and causing the latter to tilt the battery-switch. When the lamps are cut out, the magnet $y$ is deenergized and its lever $y^2$ is turned by a spring $y^4$ in such a direction that the armature is moved away from the magnet $y$ and the contacts are separated, thereby breaking the branch circuit through the battery-switch magnet and preventing the same from shifting the battery-switch.

$z$ represents a resistance which is preferably interposed between the contacts or extreme battery-terminals $m'$ and $n'$ of the battery-switch.

Assuming that the dynamo is running at a normal speed, that the lamps or other transmitting devices are in use, that the battery-switch levers are tilted and are with their arms $q\ r$ in engagement with the contacts $m\ n$ and with their arms $q'\ r'$ out of engagement with the contacts $m'\ n'$, and that the storage battery B' has previously been charged, the current generated by the dynamo is distributed as follows: Commencing at the brush $d$ the current passes successively through the contact $e$, switch-blade $h$, contact $f$, wire F, post $k$, and arm $q$ to contact $m$. At the latter point the current divides, and one part thereof passes through the wire $o$ to the storage battery B and charges the same, thence along wire I, wire G, contact $g'$, blade $h'$, contact $e'$, and brush $d'$ to the armature-commutator. The other part of the current passes from the contact $m$ through the diagonal wire $o'$, contact $n'$, resistance $z$, contact $m'$, diagonal wire $p'$, contact $n$, lever $r$, post $k'$, wire L, including coil of magnet $y$, lamps C, and then unites with the current of the charging-battery B in its return passage along the wire G to the dynamo.

The resistance is preferably so proportioned that the pressure of the current after passing the resistance is somewhat less than the pressure of the charged battery, so that the latter under normal conditions will discharge slightly. The current so discharged by the battery and the dynamo-current which passes the resistance unite and pass through the lamps and back to the dynamo. If the voltage of the current generated by the dynamo rises above the normal by reason of an increased speed of the dynamo and the pressure of the current after passing the resistance is greater than the pressure of the charged battery, the pressure of the dynamo-current overcomes that of the charged battery and passes through the latter to the return-wires I G, thereby increasing the charge of the charged battery. The charged battery thus serves as a regulator by absorbing any excessive pressure of the dynamo-current which the lamps do not take up, thereby avoiding undue pressure and wear on the lamps and causing the same to burn more uniformly.

When the dynamo has stopped or has been cut out by the slow speed of the car and then resumes the generation of a normal current—for instance, when the car has stopped or slowed up and then proceeded or has reversed its direction of motion—the connection of the batteries is reversed automatically. The battery which was previously connected with the dynamo is now connected with the lamps or service-circuit to supply the same in part, and the battery which was previously connected with the lamps is now connected with the dynamo to be charged thereby. This is accomplished by the reversal of the battery-switch by the operation of the battery-magnet, as heretofore described, whereby the switch-arms $q'\ r'$ are engaged with the contacts $m'\ n'$ and the switch-arms $q\ r$ are disengaged from the contacts $m\ n$, as shown in Fig. 2. The current from the dynamo now passes through the wire F, post $k$, and arm $q'$ to contact $m'$, where it divides, and one part passes through the diagonal wire $p'$, contact $n$, and wire $p$ to the exhausted battery B' for charging the same. The other part of the current passes through the resistance to contact $n'$, where it is joined by the discharge from the charged battery B coming over wire $o$, contact $m$, and wire $o'$. The combined currents from the dynamo and the battery B pass from the contact $n'$ through arm $r'$, post $k'$, and wire L to the lamps.

If the lamps are all cut out, the circuit through the wire L is broken, and the magnet $y$, located in the same, is deënergized. This causes the separation of the contacts $x\ x'$ in the branch circuit in which the battery-switch magnet is located, whereby the latter is rendered inoperative, and its armature is released, thereby causing the switch-levers to assume a balanced or horizontal position, in which each lever engages simultaneously with the contacts on both sides thereof, as shown in Figs. 3 and 4. In this position of the switch-levers the current of the dynamo divides at the post $k$, one part passing by arm $q$, contact $m$, and wire $o$ to the battery B and the other part passing from post $k$ by arm $q'$, contact $m'$, wire $p'$, contact $n$, and wire $p$ to the other battery B', thereby placing both batteries in parallel with the dynamo and charging both simultaneously.

If the lamps are in use and the dynamo is cut out or stops running, the battery-switch magnet becomes inoperative, and the switch-levers Q R assume the same horizontal or balanced position which they occupy when the lamps are cut out. This places both batteries in parallel with the lamps and the current now discharged from both batteries feeding the lamps, the current from battery B passing through wire $o$, contact $m$, wire $o'$, contact $n'$, and arm $r'$ to post $k'$, where it is joined by the current from battery B' passing along wire $p$, contact $n$, and arm $r$. The currents of both batteries pass together from post $k'$ by wire L to one side of the lamps and return by wire I to the opposite terminals of both batteries.

By connecting both storage batteries in parallel when the lamps are cut out or when the dynamo is cut out the batteries are charged or are discharged at the same time, thereby avoiding greater wear on one battery than on the other and causing them to work more uniformly.

If desired, the resistance $z$ between the contacts $m'$ and $n'$ may be omitted, as shown in Fig. 4, in which case the dynamo under normal conditions will be connected with only one battery for charging the same, while the lamps or other translating devices are connected with the other charged battery. As shown in Fig. 4, the switch-levers are connected only with the contacts $m'$ $n'$. The dynamo-current delivered by wire F passes through post $k$, arm $q'$, contact $m'$, wire $p'$, contact $n$, and wire $p$ to battery B' and then passes by wires I G to the opposite side of the dynamo. The current from the charged battery B passes from one terminal thereof through wire $o$, contact $m$, wire $o'$, contact $n'$, arm $r'$, post $k'$, and wire L to one side of the lamps and returns by wire I from the other side of the lamps to the opposite terminal of the charged battery B. When the battery-magnet T reverses the battery-switch levers, they bear only against the contacts $m$ $n$, whereby the exhausted battery B is connected with the dynamo and the charged battery B' is connected with the lamps.

If the lamps are cut out while the dynamo is running or if the dynamo is cut out while the lamps are in use, the switch-levers connect the contacts $m$ $m'$ and $n$ $n'$ and couple the batteries in parallel, so that both batteries are charged at the same time by the dynamo or feed the lamps at the same time, this operation being the same as when the resistance is employed.

By leaving out the resistance the lamps burn uniformly because they are fed only by the discharging-battery and are not affected by the fluctuations of the dynamo. It is desirable, however, to employ the resistance because it permits the lamps to be fed principally by the dynamo when the car is running, thereby holding the pressure of the charged battery in reserve for use when the car stops or the dynamo is cut out.

I claim as my invention—

1. The combination with a dynamo, two storage batteries, a charging-circuit and a service-circuit, of an automatic switch which is interposed between said circuits and batteries, said switch being provided with contacts for alternating the connections between the batteries and said circuits and for connecting both batteries in parallel with the service-circuit, and with a switch-lever arranged to alternate the connections in either of its extreme positions and to connect both batteries in parallel with the service-circuit in its intermediate position, an electromagnet which is deënergized when the service or the charging circuit is broken and thereby allows the switch-lever to assume said intermediate position, and means whereby said magnet, upon being energized, shifts the switch-lever to one of its extreme positions, substantially as set forth.

2. The combination with a dynamo, two storage batteries, a charging-circuit and a service-circuit, of an automatic switch which is interposed between said circuits and batteries, said switch being provided with contacts for alternating the connections between the batteries and said circuits and for connecting both batteries in parallel with the service-circuit, and with a switch-lever arranged to alternate the connections in either of its extreme positions and to connect both batteries in parallel with the service-circuit in its intermediate position, an electromagnet which is arranged in a branch of the charging-circuit and which, when deënergized, allows said switch-lever to assume said intermediate position and which is provided with means whereby said magnet, upon being energized, shifts the switch-lever to one of its extreme positions, a switch arranged in said branch circuit to open and close the same, and an electromagnet which operates said branch switch and which is arranged in the service-circuit, substantially as set forth.

3. The combination with the storage batteries and the charging and service circuits, of an automatic switch embodying rocking contact-levers capable of assuming an inclined position in either direction, in which they make contact on one side of their pivots and not on the other, and also capable of assuming an intermediate position, in which they make contact on both sides of their pivots, contacts arranged on opposite sides of the pivot of each lever, connections which are arranged to extend from the two contacts opposing one lever separately to both batteries, and from the two contacts located on the same side of the pivots of both levers to both batteries, and posts on which said levers are pivoted and which are connected one with the charging and the other with the service circuit, whereby the levers in either extreme position connect one battery directly with the charging-circuit and the other directly with the service-circuit and alternate such connections upon assuming the other extreme position, while the levers in their intermediate position connect both batteries in parallel with the charging and service circuits, substantially as set forth.

4. The combination with the storage batteries and the charging and service circuits, of an automatic switch embodying rocking contact-levers capable of assuming an inclined position in either direction, in which they make contact on one side of their pivots and not on the other, and also capable of assuming an intermediate position, in which they make contact on both sides of their pivots, contacts arranged on opposite sides of the pivot of each lever, one being connected with one battery and the other forming the extreme terminal of the other battery, a resistance interposed between the extreme terminals of both batteries, and posts on which said levers are pivoted and which are connected one with the charging and the other with the service circuit, substantially as set forth.

5. The combination with the rocking switch-levers, the contacts arranged on opposite sides of their pivots, and the actuating-magnet and armature, of a rocking link pivoted at one end to the armature and adapted to bear with its free opposite end upon said levers, and a stop which is encountered by the link as the latter moves with the armature and whereby the link is rocked on its pivot and its free end is thrown from one side of the pivot-line of the levers to the other, substantially as set forth.

6. The combination with the rocking switch-levers, the contacts arranged on opposite sides of their pivots, and the actuating-magnet and armature, of a rocking link pivoted to the armature and adapted to bear with its free end upon said levers, a stop whereby the link is rocked on its pivot and its free end is thrown from one side of the pivot-line to the other, and a righting-spring whereby the levers are held in an intermediate position when released by the magnet, substantially as set forth.

7. The combination with the rocking switch-levers provided with righting-arms and the contacts arranged on opposite sides of their pivots, of an actuating-magnet, a movable armature, a rocking link pivoted to said armature and bearing with its free end upon said levers, a stop whereby the free end of said link is shifted from one side of the pivot-line of said levers to the other, posts on which said levers are pivoted, and a righting-spring applied to the pivot of each lever and bearing against each post and righting-arm, substantially as set forth.

8. The combination with the rocking switch-levers and the contacts arranged on opposite sides of their pivots, of an electromagnet and armature, a shifting link pivoted at one end to said armature and provided with shifting arms projecting in opposite directions, said link bearing with its opposite end upon said levers and being free to move from one side of the pivot-line to the other, a plate on which said levers are pivoted, and yielding stops secured to said plate and adapted to arrest the movement of said arms and so shift the link, substantially as set forth.

9. The combination with a dynamo, two storage batteries, a charging-circuit and a service-circuit, of an automatic battery-switch interposed between said circuits and said batteries, an electromagnet which operates said switch and which is arranged in a branch of the charging-circuit, an automatic reversing contact-lever and contacts whereby the charging-circuit is made and broken upon the stopping and starting of the dynamo, and a contact-blade carried by said reversing contact-lever and contacts in said branch circuit, whereby said branch circuit is made and broken simultaneously with the making and breaking of the charging-circuit, substantially as set forth.

Witness my hand this 7th day of February, 1899.

OSBORN P. LOOMIS.

Witnesses:
S. R. BEERYE,
W. H. LANDON.